United States Patent [19]

Eatinger

[11] Patent Number: 5,401,129

[45] Date of Patent: Mar. 28, 1995

[54] TRAILER FOR HAULING METAL COILS

[75] Inventor: Thomas E. Eatinger, Schererville, Ind.

[73] Assignee: Area Transportation Co., Gary, Ind.

[21] Appl. No.: 186,670

[22] Filed: Jan. 25, 1994

[51] Int. Cl.$^6$ .............................................. B60P 7/12
[52] U.S. Cl. .......................................... 410/49; 410/50
[58] Field of Search ..................... 410/30, 32, 36, 42, 410/47, 49, 50; 188/32; 105/377 H, 377 J, 377 R

[56] References Cited

U.S. PATENT DOCUMENTS

| | | | |
|---|---|---|---|
| 2,810,602 | 10/1957 | Abrams | 410/49 X |
| 3,009,426 | 11/1961 | Nampa | 105/377 J X |
| 3,291,073 | 12/1966 | James | 410/49 |
| 3,605,638 | 9/1971 | James | 410/49 |
| 3,829,148 | 8/1974 | Stoneburger | 410/49 |
| 4,451,188 | 5/1984 | Smith et al. | 410/42 |
| 4,653,967 | 3/1987 | Isaksson et al. | 188/32 X |
| 5,170,717 | 12/1992 | Richmond et al. | 410/49 X |
| 5,211,518 | 5/1993 | Mimica | 410/50 |

FOREIGN PATENT DOCUMENTS 3637127  8/1987  Germany ................. 410/32

*Primary Examiner*—David A. Bucci
*Assistant Examiner*—Stephen Gordon
*Attorney, Agent, or Firm*—Emrich & Dithmar

[57] ABSTRACT

A trailer apparatus for transporting metal coils. A pair of laterally spaced apart longitudinally extending main frame members having a front portion and a rear portion and a central portion positioned lower than the front and rear portions. Angularly disposed rear transition portion connecting said central and rear portion and an angularly disposed rear transition portion connect the central, front and rear portions. There are front and rear support surfaces extending transversely across the main frame members respectively at the front and rear transition sections to provide front and rear rack members along one or more movable rack members each having a support surface extending transversely across the main frame members at the central portion thereof and angularly disposed thereto in the range of from about 22° to about 35°. Mechanism is provided for fixedly mounting the movable rack members on the frame members to form a loading rack with one or both of the front and rear rack members so metal coils can be supported such that the longitudinal axis of the metal coils is perpendicular to the main frame members. Front and rear canopies are provided to cover the loads.

15 Claims, 5 Drawing Sheets

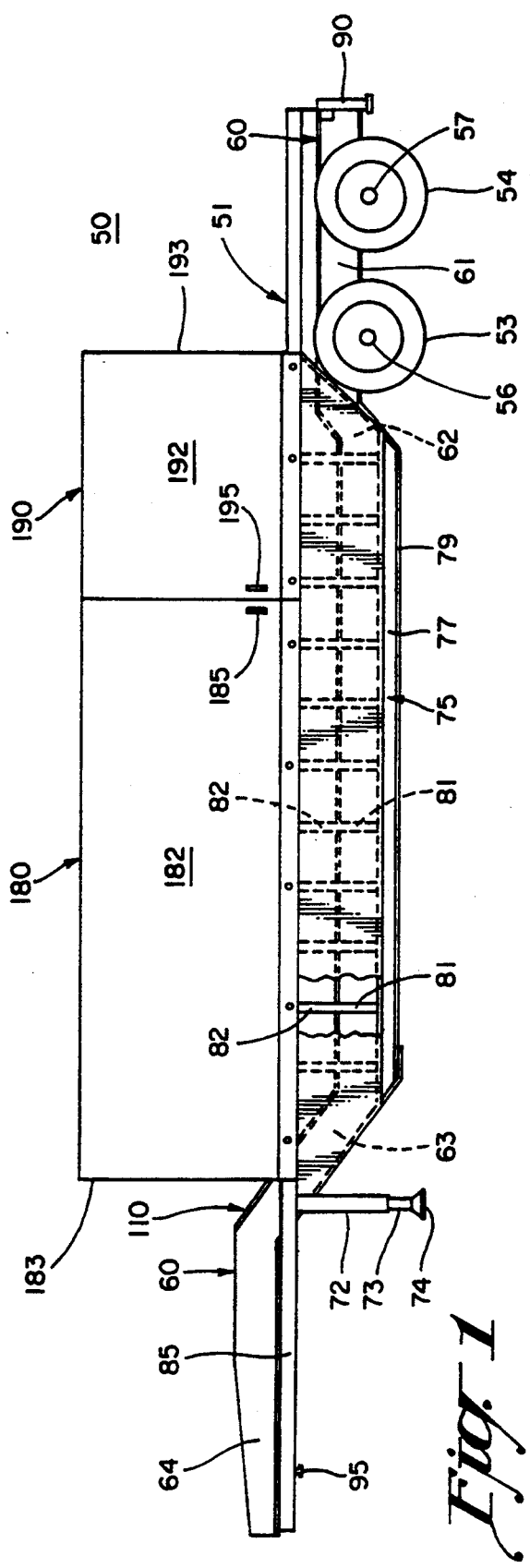
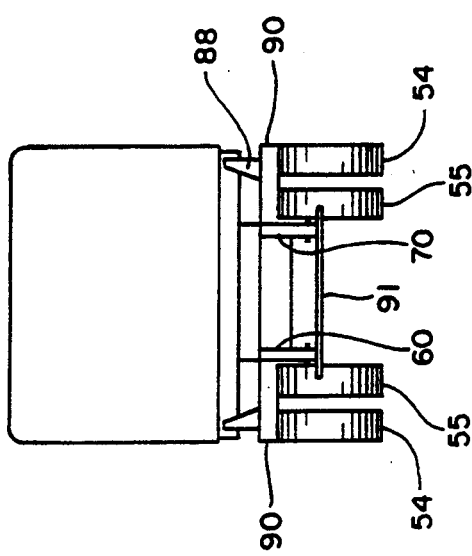

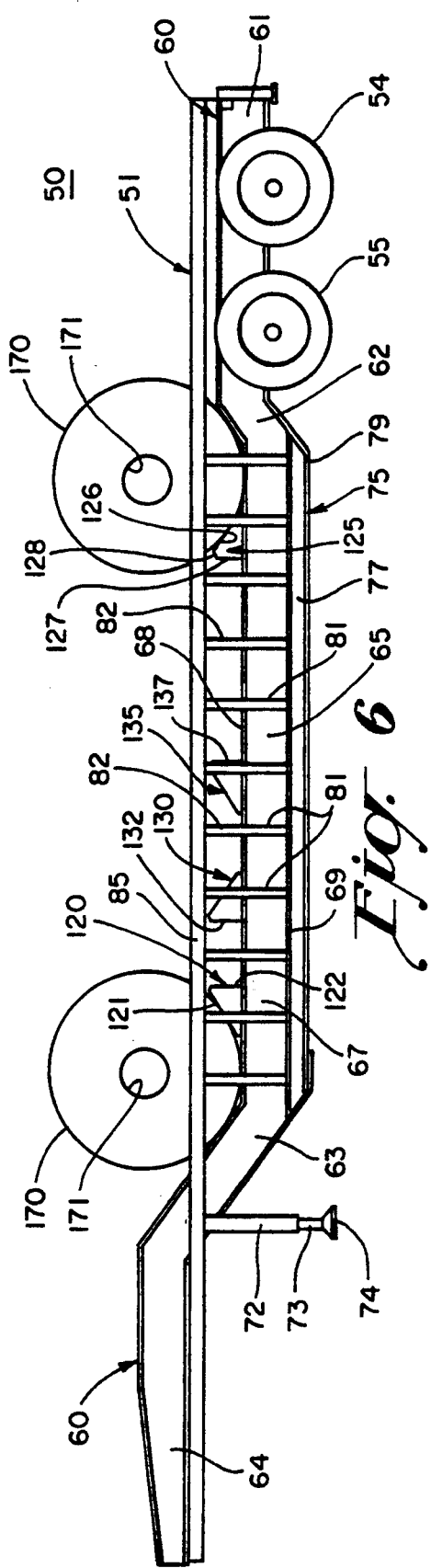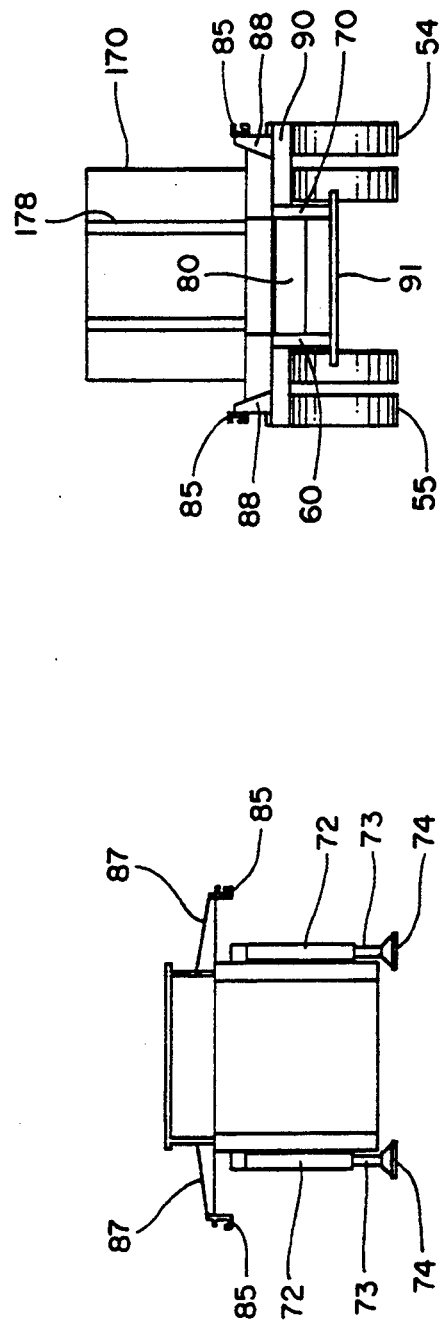

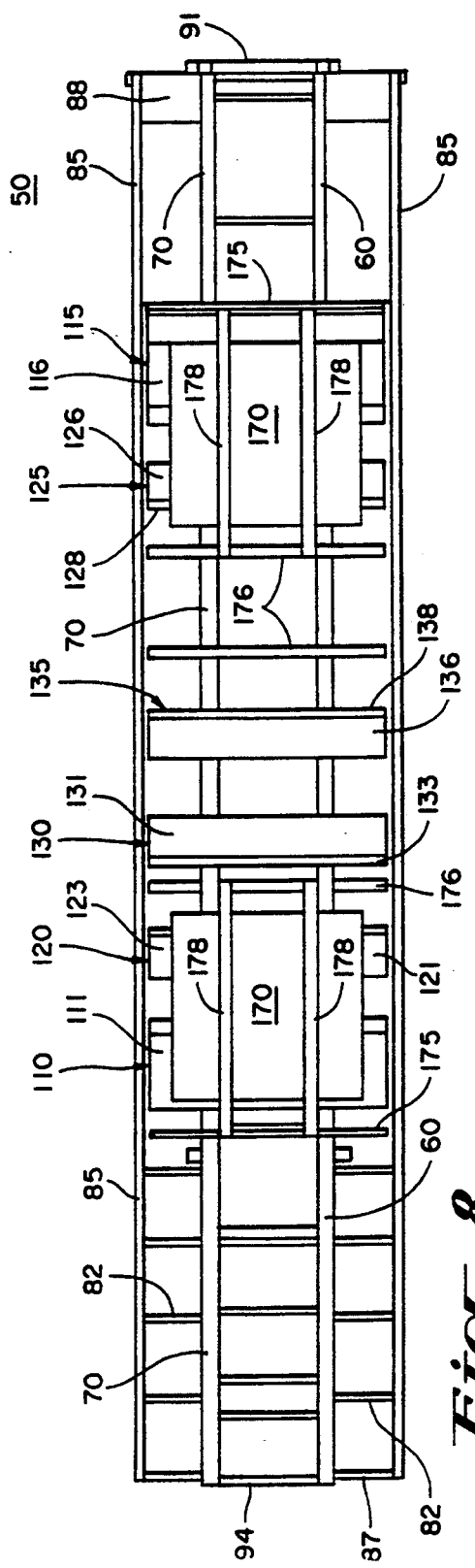
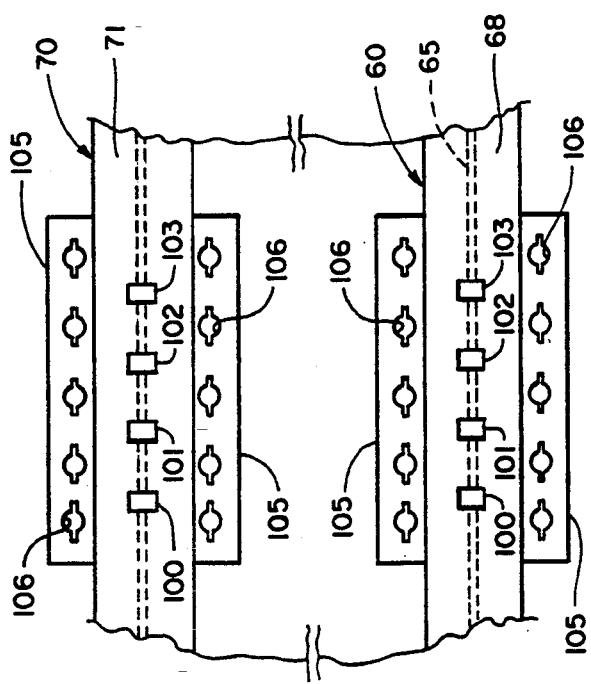
Fig. 8
Fig. 9

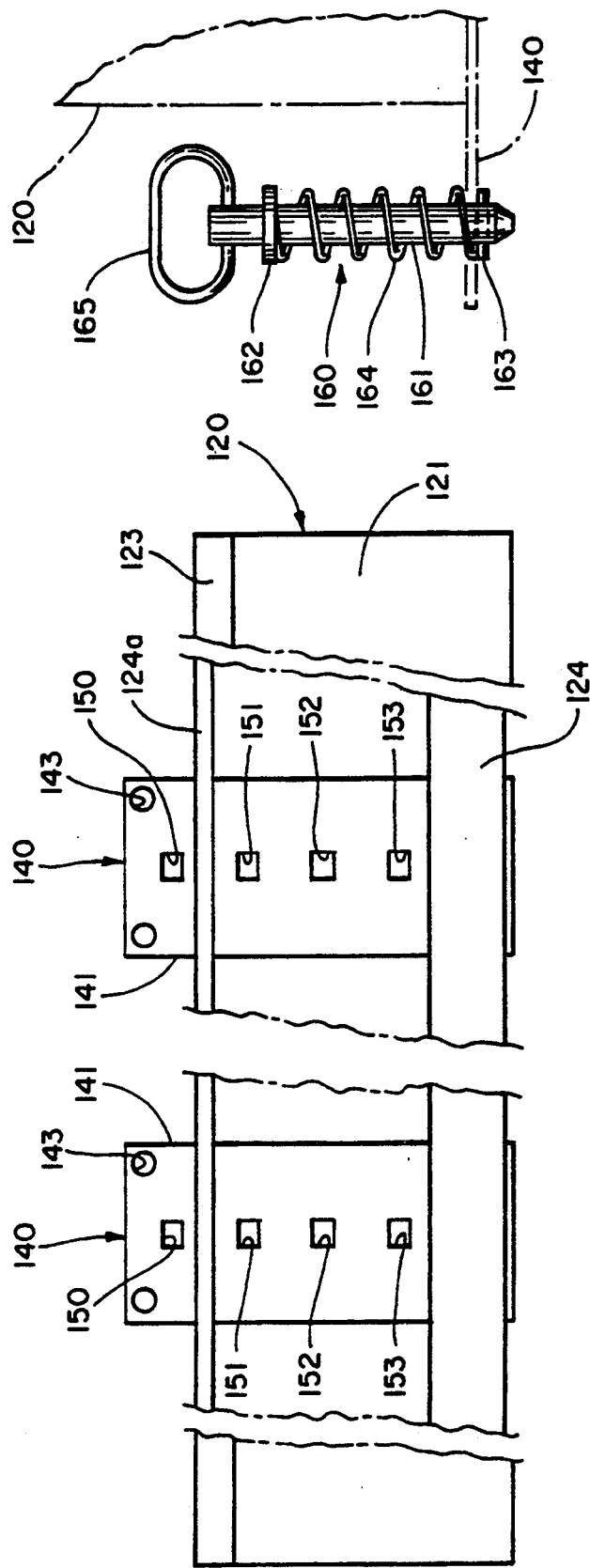

TRAILER FOR HAULING METAL COILS

BACKGROUND OF THE INVENTION

1. Field of the Invention

The present invention pertains to truck trailers for hauling relatively large, dense objects, and in particular to heavy objects such as steel or aluminum coils which are heavy, yet relatively delicate, and which have rounded surfaces.

2. Description of the Related Art

Different types of products being shipped today over the road require special handling considerations. For example, steel products by truck. Steel products are shipped in a variety of different configurations, including flats, rounds, and coils. In the past, it has been found desirable to have a single type of truck trailer haul the various steel products. So-called platform trailers have been employed to ship the various types of steel products. Flats and rounds are typically cut in fairly long lengths, and are typically laid along the major axis of the platform trailer.

Outside of weight considerations and considerations of trailer loading capability, careful attention must be paid to avoid shifting the steel load on the platform trailer, particularly when the trailer, travelling on the highway at customary speeds, is brought to a sudden stop. The shipping of metal coils raises other considerations, in addition to those already mentioned. Metal coils, by their nature, have rounded surfaces on which the coils can roll. Thus, if the coils should become dislodged from a moving trailer it is possible that the coils will roll into traffic before coming to rest. Further, even when the coils are securely restrained on a platform trailer, great care must be exercised to insure the coils do not rock back and forth on their rounded surfaces, thereby being allowed to build up momentum which might overtax the securing devices.

Further considerations are raised when hauling steel or aluminum coils, which are unique to that product configuration. Basically, the metal coil comprises a winding of metal sheeting which is coiled for convenient bulk transport. With current manufacturing techniques, including "just-in-time" techniques, and zero defect manufacturing tolerances, consumers of the metal coils have demanded that the coils be shipped without damage of virtually any kind, so that the coils can be unloaded and set up at the last minute in a manufacturing operation. The metal coils are quite massive, and are typically supported on end, along a tangent line to the curved surface of the coil. Due to the mass of the coil, this results in a relatively high pressure being applied to local portions of the metal coil, which is amplified as the coil shifts or rocks during transport. Considerable attention has been paid to the special handling required for metal coils, and an improved motor vehicle trailer has been sought.

Generally, coils are carried by truck trailers in one of two positions, either with the core of the coil facing in the direction of the travel such as disclosed in the Mimica U.S. Pat. No. 5,211,518 or in a position where the core of the coil is transverse to the longitudinal axis of the truck trailer and transverse to the direction of travel, which position is known as the "suicide" position since if the coils become free as a result of a sudden stop or the like, the driver is in mortal danger.

SUMMARY OF THE INVENTION

It is an object of the present invention to provide a vehicular trailer apparatus for conveying articles having rounded surfaces such as steel coils in the suicide position.

Another object of the invention is to provide what is called a low-boy trailer apparatus which has two permanent loading racks disposed such that either one or two coils may be carried by the permanent loading racks and the load can be balanced for transportation.

Another object of the present invention is to provide a trailer apparatus of the type set forth which includes not only permanent loading racks but also one or more movable loading racks in order to transport up to about four coils.

Another object of the invention is to provide a vehicular trailer of the type set forth which accommodates coils having diameters from 36" to in excess of 88".

Yet another object of the invention is to provide a trailer of the type set forth in which a split canopy is employed to cover the load which permits not only overhead loading but side loading of the all of the coils transported by the trailer apparatus.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a motor vehicle trailer for hauling metal coils with a split cover in place;

FIG. 2 is a rear elevational view of the trailer illustrated in FIG. 1 as seen from the right hand side thereof;

FIG. 5 is a front end elevational view of the motor vehicle trailer illustrated in FIG. 4 as seen from the left hand end thereof;

FIG. 6 is a side elevational view of the motor vehicle trailer illustrated in FIG. 1 with the cover removed and two metal coils in place;

FIG. 7 is a left end elevational view of the loaded trailer illustrated in FIG. 6;

FIG. 8 is a plan view of the loaded trailer illustrated in FIG. 6;

FIG. 9 is an enlarged plan view of the main frame assembly showing the locking mechanism on the longitudinally extending I-beams forming the main frame for the loading racks holding the coils;

FIG. 10 is a plan view of a movable loading rack illustrated in FIG. 8 showing the locking plates which cooperate with the mechanism shown in FIG. 9; and FIG. 11 is an side elevational view of a locking pin used to lock the mechanism of FIG. 9 and plates of FIG. 10 together.

DETAILED DESCRIPTION OF THE PREFERRED EMBODIMENT

Figure 3:
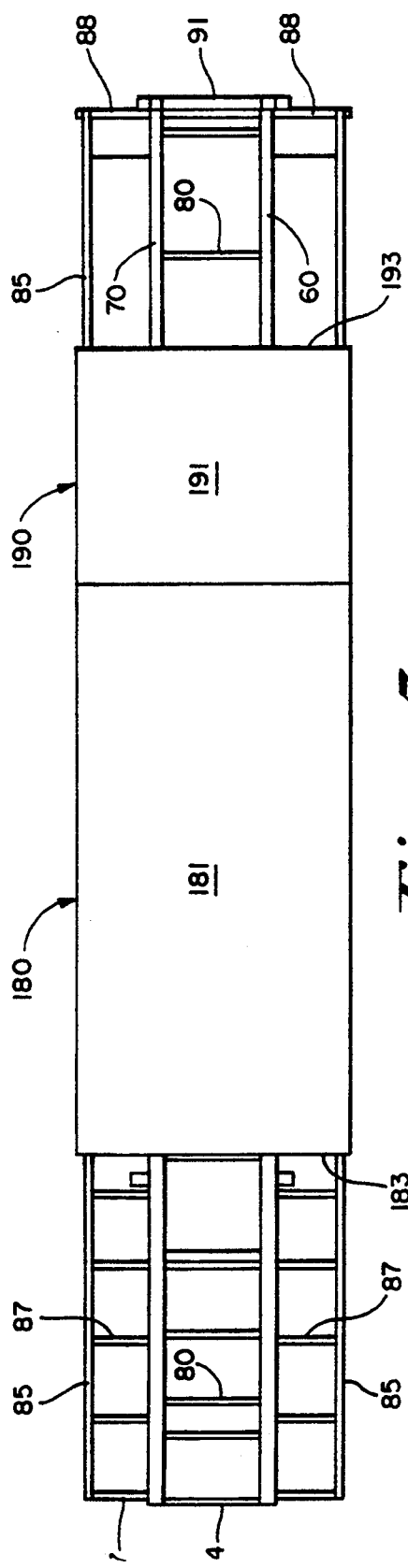
FIG. 3 is a top elevational view of the motor vehicle trailer illustrated in FIG. 1.

Referring now to the drawings, and particularly to FIGS. 1–8 thereof, there is shown a motor vehicle trailer for hauling metal coils of the drop deck type 50 which includes a frame assembly 51 supported at the rear thereof by forward tandem axle wheels 53 and rearward tandem axle wheels 54. There being two sets of tandem wheels at 55 supported on forward and rearward axles 56 and 57, respectively.

The frame assembly 51 includes a pair of laterally spaced apart longitudinally extending I-beams 60 and 70, the I-beam 60, for instance, although both I-beams have the same construction, has a rear horizontal portion 61, a rear transition portion 62 angularly disposed to the horizontal rear portion 61, a forward transition portion 63 angularly disposed with respect to the horizontally positioned forward portion 64 and a central portion 65 intermediate the rear transition portion 62 and the forward transition portion 63. The I-beam 60 includes a vertically extending web portion 67 with the usual upper horizontally extending flange 68 and lower horizontally extending flange 69, all as is well known in the art with respect to an I-beam construction. Preferably, the transition portions 62 and 63 are securely fastened such as by welding to the rear portion 61, central portion 65 and the forward portion 64 secured to the forward portion 64 is a downwardly depending kingpin 95 for connection to an associated motor vehicle, as is well known. The other I-beam 70 is similar to if not identical to the I-beam 60 and includes an upper flange 71 and all the other corresponding parts previously recited with respect to the I-beam 60 including the transition portions as well as the forward portion, rearward portion and central portion. A landing gear 72 extends vertically and includes a sleeve portion and an inner telescoping portion 73 and a foot portion 74, there being two such landing gears 72 positioned near the forward portion of the frame assembly 51 to support the trailer assembly 50 when a motorized vehicle is not connected thereto, all as is well known.

The central portion of the frame assembly 51 is provided with a reinforcement support structure which is securely fastened to the central portions of each of the I-beams 60 and 70. Specifically, each of the support beams 75 is in the form of a half of an I-beam with a web 77 and a lower flange 79 and is welded to each of the bottom flanges of the I-beams 60 and 70 in the central portions thereof between the forward and rear transition portions so as to provide additional support for the heavy loads transported while keeping the overall weight of the drop deck trailer assembly 50 low. More particularly, the central portion of the frame assembly 51 is less than three feet above the ground, that is the top flanges 68 and 71 are preferably no more than 30" above the ground, thereby providing a low center of gravity.

The frame assembly 51 includes a plurality of cross members 80 interconnecting the longitudinally extending I-beams 60 and 70 at various points therealong, the exact number and location of the cross brace members 80 is not critical and is well within the design skill of the art. Along the central portion of the frame assembly 51 are a plurality of struts 81 extending angularly outwardly and upwardly from the bottom flange of the I-beams 60 and 70 and then connected to a strut 82 extending vertically upwardly so as to support a canopy rail 85 C-shaped in cross section at a position above the wheels 54, 55 and outwardly of the main frame members 60 and 70. Forwardly and rearwardly of the central portion of the frame assembly 51 wing struts 87 (see FIG. 5) and triangular struts 88 serve to support the canopy rails 85.

A rear bumper 90 extends transversely of the I-beams 60 and 70 and is fixedly connected thereto and has a bar 91 positioned below the bumper 90 and fixedly connected thereto, as all is well known in the art.

Referring now to FIG. 9, there is disclosed locking mechanism associated with each of the I-beams 60 and 70 positioned at four longitudinally spaced apart areas to enable the coil racks, as will be described, to be located at preselected points longitudinally spaced along the I-beams 60 and 70 and to accommodate coils of different diameters. More specifically, there are provided at spaced apart intervals along the top flanges 68 and 71 of the I-beams 60 and 70, respectively, a plurality of longitudinally spaced apart lugs 100, 101, 102 and 103, each of which extend perpendicularly upwardly from the respective horizontally disposed flange for a purpose hereinafter set forth. The lugs 100-103 are positioned so that coils having diameters of 36", 48", 60", 72" or 84" can be accommodated as will be described. On each side of the I-beams 60 and 70 is an outwardly and longitudinally extending flange 105 which is securely fastened to the underneath side of the top flange of the respective I-beams 60 and 70 such as by welding. Each flange 105 has a plurality of longitudinally spaced apart locking slots 106 in the form of generally circular opening with rectangular openings extending along a line parallel to the web of the associated I-beam 60 and 70. As illustrated in FIG. 9, there are two such locking plates 105 for each set of lugs 100-103 for each I-beam 60 and 70. As illustrated in FIG. 9, there are four such plates 105 associated with each movable rack, as will be explained. Because there are two permanent racks and two more optional movable racks, there may be between two sets of eight lugs 100-103 and six sets of eight lugs, depending on the number of racks to be carried by the frame assembly 51.

Figure 4:
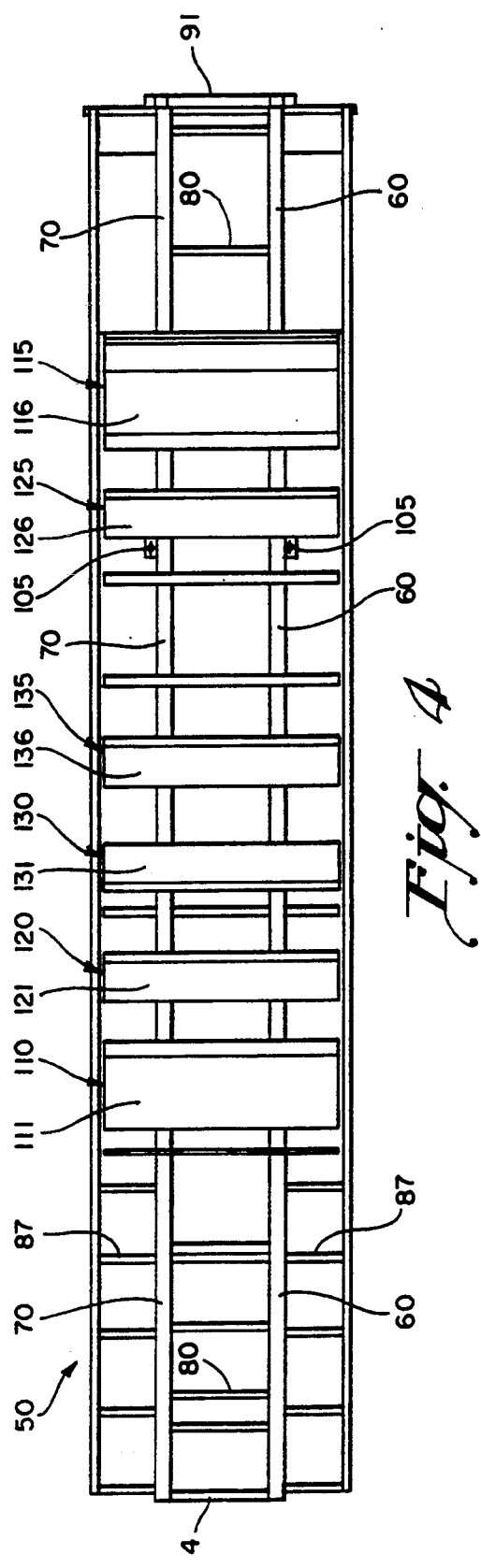
FIG. 4 is a plan view of the trailer illustrated in FIG. 1 with the cover removed and without metal coils therein.

There are two permanent racks associated with the trailer 50. A front rack 110 and a rear rack 115. The permanent front rack 110 includes a support sheet 111 which extends transversely of the I-beams 60 and 70 and extends substantially between the two longitudinally extending canopy rails 85, as illustrated in FIGS. 3, 4 and 8. The sheet 111 preferably has a resilient covering of a rubber like material at least 1" in thickness and preferably 1¼ in thickness for a purpose hereinafter set forth. The support sheet 111 being positioned on the front transition portions of the I-beams 60 and 70. A rear permanent rack 115 is positioned rearwardly of the front permanent rack along the transition portions of the I-beams 60 and 70 and includes a transversely extending support sheet 116 also preferably covered with a resilient covering such as a weatherproof rubberized material at least 1" inch and preferably 1¼ thick. The two permanent racks 110 and 115 located forwardly and rearwardly of the frame assembly 51 are angularly disposed with respect to the central portion of the frame assembly 51 at an angle in the range of between about 22° and about 35° with the preferred angle being about 35°.

There are a plurality of movable racks such as rack 120 most easily seen in FIGS. 6, 8 and 10. Each of the movable racks is associated with a permanent rack 110 or 115 or with another movable rack such as rack 120 which has a transversely extending support sheet 121 provided preferably, but not necessarily, with a resilient covering.

Each of the movable racks 120 further has a back sheet 122 and a top 123, as best seen in FIGS. 8 and 10 as well as a bottom member 124. A bar 124a (see FIG. 10) extends across the back of the movable rack 120 to enable the driver or other operator to move the movable rack 120 without undue difficulty.

A plurality of other movable racks are shown in the drawings, these being the movable rack 125 which is similar in construction to the movable rack 120 and is positioned toward the rear portion of the frame assembly 51. The movable rack 125 includes a support sheet 126 having a resilient covering and a back sheet 127 provided with a bar, not shown, to enable the movable rack 125 to be moved along the I-beam 60 and 70 and will be explained. The rack 125 is also provided with a top 128 as best seen in FIG. 6.

Two more cooperating movable racks 130 and 135 are illustrated in FIG. 6 as well as FIGS. 4 and 8 to illustrate the difference between loading racks wherein only one of the racks is movable and both portions of the loading racks are movable. It is contemplated that there be up to two entirely movable loading racks each provided with two portions. For instance, movable rack 130 includes an angularly disposed support sheet 131 having a resilient surface thereon, a back sheet 132 and a top sheet 133. The movable rack 135 also includes angularly disposed support sheet 136 which is preferably resilient or has a resilient member thereon, a back sheet 137 and a top 138. In all cases, the support surfaces for the metal coils are preferably angularly disposed with respect to the longitudinal axis of the central portion of the I-beams 60 and 70 between 22° and 35° with 35° being preferable. This is true not only for the permanent racks 110 and 115 but for all the movable racks associated with the trailer assembly 50.

In order to maintain the movable racks 120, 125, 130 and 135 in place to support metal coils which may be as heavy as 60,000–70,000 pounds, it is necessary to provide a locking mechanism which will withstand the enormous forces generated by these metal coils not only at rest but also when the vehicle moves and moves under conditions normally encountered during long haul transportation. Not only are there momentum shifts to be dealt with that are along the longitudinal axis of the trailer 50 but also there are centrifugal forces which occur when curves are navigated as well as oscillation forces which occur when the roadway is bumpy or when rapid up and down movement such as a long hilly terrain is encountered.

In order to maintain the movable racks 120, 135 in place, a locking mechanism is used which cooperates with the locking plates 105 which are mounted along the I-beams 60 and 70. Each of the movable racks 120, 125, 130 and 135 is provided with, as best seen in FIG. 10, two laterally spaced apart stop plates 140. The stop plates 140 are spaced apart so as to be in registry with the I-beams 60 and 70 and more particularly, with the upper flanges of the I-beams 60 and 70. Although the plates 140 in fact have a greater transverse dimension than the I-beams which is at least equal to the distance between the locking apertures 106 in each of the two side flanges 105 welded or otherwise fixed to each of the upper flanges on the I-beams 60 and 70. More particularly, each stop plate 140 consists of a rectangular sheet or plate 141 into which are cut two circular openings 143 near one end of the stop plate 140 and positioned so that when the movable rack 120-135 is in position to be locked, the apertures 143 are in registry with a set of apertures 106. Further, each of the stop plates 140 is provided with a plurality of longitudinally spaced apart rectangular slots 150, 151, 152 and 153 which are positioned so that when the plate 140 is in registry with the flanges 105, at least one of the lugs 100-103 extends through at least one of the openings 150-153 of each plate 140.

Thereafter, a locking pin 160, as best seen in FIG. 11, is locked so as to maintain the plates 140 in registry with the flanges 105 and to prevent the the movable rack 120-135 from moving. Each of the locking pins 160 includes a cylindrical shaft 161 having a circular collar 162 fixedly mounted on the shaft 161 near the top thereof and a locking or roll pin 163 removably inserted through an aperture in the shaft 161 near the bottom thereof. A coil spring 164 is trapped between the collar 162 and the pin 163, a handle 165 being provided at the top of the pin 160. In practice, one locking pin 160 is provided for each aperture 143 and each stop plate 140 so that each movable rack has four pins 160 associated therewith.

Coils 170 may be carried by the trailer 150 in a configuration such that the core 171 of each of the metal coils 170 is transversely disposed to the longitudinal axis of the trailer 50. As previously discussed, these coils 170 are transported in the suicide position. In order to maintain the coils 170 in place, there are provided associated with each rack assembly a strap securement bar such as 175 and a winch bar 176. These mechanisms are well known in the art and permit straps such as 178 to be secured over each coil 170 so as to limit the amount of movement of the coil 170 during transportation.

The two longitudinally extending canopy rails 85 support both front and rear canopies 180 and 190, respectively, it being understood that each of the canopy rails 85 is C-shaped in transverse cross section and the canopies 180 and 190 are provided with oversized rollers compared to those disclosed in the previously mentioned Mimica patent so as to provide easier rolling of the canopies 180 and 190 along the rails 85. There is also provided but not shown lubricated bearings for the rollers so as to facilitate movement of the front and rear canopies 180, 190. The front canopy 180 is generally box shaped and includes a rectangular top 181 integral with two depending sides 182 and a front panel 183. Handles 185 are provided on each of the side panels 182. Similarly, the rear canopy 190 is provided with a generally flat top panel 191 and depending side panels 192 and a rear panel 193. Handles 195 are provided on each of the side panels 192 to facilitate easy operation of the rear canopy 190, all for a purpose hereinafter set forth.

The advantages and operation of the drop deck trailer assembly 50 are hereinafter set forth.

Referring now to FIGS. 1 and 3, it is seen that the canopies 180 and 190 are in the closed position thereof, but in order to load the trailer 50, it is necessary to move the canopies from the closed position as illustrated in the drawings to the opening position thereof, wherein the rearward canopy 190 is moved to the right as seen in FIGS. 1 and 3 until the rear wall 193 is substantially in alignment with the rear struts 88 whereas the forward canopy 180 is moved to the left as seen in the drawings until the front wall 183 is substantially in alignment with the front brace 94, thereby to expose the central portion 65 of the frame assembly 51 for loading and unloading. A significant advantage of the construction herein disclosed is the ability to load coils 170 from either the top by use of an overhead crane or from the side by use of a forklift which can either insert or retract coils from the frame assembly 51. For instance, the Mimica U.S. patent previously described requires an overhead crane to load and unload whereas the present invention accommodates either overhead or side loading, a significant advantage in the art.

Depending upon the size of the metal coil 170 and the number of coils to be transported, and also depending upon the gross weight of the vehicle permitted to be transported, one or more coils may be loaded onto the trailer assembly 50. For instance, transporting an 88" diameter steel coil may result in an single 60 or 70,000 pound load being transported, whereas transporting aluminum or lighter weight metals may involve transporting four 36" diameter coils. In any event, the construction of the present invention provides enormous versatility in facilitating the transportation of metal coils, a versatility not heretofore available in any constructions known to the inventor herein.

More particularly, the use of permanent racks 110 and 115 as supported by the transition portions of the two main I-beams 60 and 70, respectively, is an important advantage of the present invention. Because the movable racks 120-135 which work in combination with the permanent racks 110 and 115, each provide for transportation of coils having diameters of between about 36" and about 84-88". This versatility has not been available in the prior art. The mechanism by which the racks are moved to accommodate coils of different diameter involves the cooperation of the longitudinally spaced apart lugs 100-103 on the I-beams 60 and 70 in cooperation with the locking plates 105, one positioned on each side of each I-beams 60 and 70, the locking plates 105 each carrying a plurality of longitudinally spaced apart locking apertures 106 therein. The lugs and locking plates cooperate with mating apertures on the stop plates 140, two of which are carried by each movable rack 120, 125, 130 and 135, all as previously described. The movable racks along with the stop plates 140 can be positioned so as to accommodate coils of different sizes, as described and when locked in place with the four locking pins 160, provided for each movable rack 120, 125, 130 and 135 serve securely to mount the movable racks to the frame assembly 51, and more particularly, to the two main I-beams 60 and 70, respectively.

Another feature of the invention is the low-boy configuration of the trailer 50 and more particularly the reinforcement of the central portion 65 of the frame assembly 51 by means of the half I-beam support 75 welded or otherwise fixedly connected to the two I-beams 60, 70 which form the central portion of the frame assembly 51. The reinforcement I-beams 75 are essential to enable transportation of heavy loads economically. The reason that the loads are transported economically is that by cutting the two I-beam 75 in half, the weight of the vehicle is reduced.

After a coil 170 is loaded onto the drop deck trailer assembly 50 and more particularly, for instance, into the rack 110, a plurality of straps 178 are positioned over the coil 170 in order to maintain the coil in place during transportation and to prevent it from rocking, sliding or otherwise moving from the rack 110. This is accomplished in a standard way, as seen in FIG. 8, by means of well known strap securement bar 175 in combination with the winch bar 176 holding up to 6 winches thereon, only two straps 178 being shown. It is understood in the art that a winch is required for each strap.

Although FIG. 8 shows only two coils 170 loaded, one for the permanent rack 110 and its movable rack partner 120 and the other coil 170 being held by the permanent rack 115 by its movable rack partner 125, there is the possibility of at least two additional coils being transported, again depending on the diameter and weight of the coils. The two movable racks 130 and 135 are representative of what is the carrying capacity for two additional coils, although only one coil could be supported by the racks 130 and 135. Each of the movable racks weighs about 80-90 pounds and is provided with a handle to facilitate movement by the driver of the racks along the I-beams 60 and 70 from one position to another to enable repositioning of the racks easily and rapidly.

Another feature of the invention is the resilient material which is disposed upon the sheets 111, 116, 121, 126, 131 and 136. The resilient sheets of material along with the construction hereinbefore disclosed enables metal coil of relatively thin sheets to be transported without damaging the metal. The present construction does not require the use of metal chains either over or through the coils thereby preventing the metal from being gouged or otherwise damaged beyond use.

Moreover, it is obvious from the construction hereinbefore set forth that the drop deck trailer assembly 50 is capable of carrying metal coils 170 of different diameters. For instance, without undue difficulty whatsoever, the trailer assembly 50 could be configured to carry two 36" coils, a 48" coil and a 60" inch coil or any variation that fits along the length of the trailer and is within the weight limits permitted by the various states.

Because of the canopies 180 and 190, no special packaging is required by the customer for the material which is being transported. Moreover, the split canopy eliminates wasted time at the customer facility since no particular precautions need to be taken nor preparations made for loading and unloading and securing the rolls on the trailer 50. Because of the loading configuration of the metal coils 170, oscillation which is a major fear for safety in the industry is prevented and with the lower center of gravity, single large rolls of metal, such as the 88" diameter aluminum roll previously discussed can be transported with safety. With the use of locking pins 160, the loading racks are prevented from moving, thereby eliminating the metal coil 170 from shifting. An underslung axle is used in order to keep the cargo's center of gravity at the lowest possible level and increases the entire unit 50 stability.

Another unique aspect of the present invention is in the main I-beams 60 and 70 functioning as part of the loading rack system, a feature which saves weight and construction costs.

Another feature of the invention is if coils are not transported, then the loading racks themselves each having a substantially flat top surface, as previously described, function as supports for bar stock or the like, although in that case, it is understood that different securement means need to be employed so as to prevent the bar stock from shifting. Also, plate stock, structurals or any type of product may be transported as long as the material is self supporting and will fit within the confines of the loading area which is generally described coextensive with the central portion 65 of the frame assembly 51.

Finally but not by any means of least importance is the fact that the described construction 50 is inherently safer than prior constructions and in large measure will prevent the possibility of metal coils working free during transportation and exiting the vehicle which is a great danger not only to the driver of the vehicle but also to the public using the road.

While there has been disclosed what is considered to be the preferred embodiment of the present invention, it is understood that various changes in the details may be made without departing from the spirit, or sacrificing any of the advantages of the present invention.

What is claimed is:

1. A trailer apparatus for transporting metal coils comprising a pair of laterally spaced apart longitudinally extending main frame members having a front portion connected to means for removably attaching said apparatus to a motorized vehicle and a rear portion associated with axle means carrying wheels thereon, said main frame members having a central portion between said front and rear portions positioned lower than said front and rear portion, said main frame members having an angularly disposed front transition portion connecting said front and central portions and an angularly disposed rear transition portion connecting said central and rear portions, said front and rear transition portions being angularly disposed to said central portion in the range of from about 22° to about 35°, front and rear support surfaces extending transversely across said laterally spaced apart longitudinally extending main frame members respectively at said front and rear transition sections to provide front and rear rack members, one or more movable rack members each having a support surface extending transversely across said laterally spaced apart longitudinally extending main frame members at the central portion thereof and angularly disposed thereto in the range of from about 22° to about 35° and means for fixedly mounting said one or more movable rack members on said frame members to form a loading rack with one or both of said front and rear rack members, said means for fixedly mounting including interconnecting lugs and apertures on said main frame members and on each said movable rack member, whereby metal coils can be supported by said front or rear and movable rack members such that the longitudinal axis of the metal coils is perpendicular to the main frame members.

2. The trailer apparatus of claim 1, wherein said main frame members are I-beams with the central portion thereof having the top flanges positioned less than 3 feet above ground level.

3. The trailer apparatus of claim 1, wherein said front and rear transition sections are angularly disposed about 35° to said central portion.

4. The trailer apparatus of claim 1, wherein said front and rear support surfaces are resilient.

5. The trailer apparatus of claim 4, wherein said one or more movable rack members have resilient support surfaces.

6. The trailer apparatus of claim 5, wherein said resilient surfaces are pads with thicknesses exceeding 1 inch.

7. The trailer apparatus of claim 1, wherein said movable rack members may be positioned with respect to said front and rear support surfaces to accommodate coils having diameters of 36" or 48" or 60" or 72" or 88".

8. The trailer apparatus of claim 1, wherein said lugs are longitudinally spaced on each main frame member and extend upwardly therefrom adjacent said front and rear transition portions, each movable rack member having a flange with at least one of said apertures therein adapted to fit over one of said lugs on each frame member, thereby to position said movable rack member with respect to said front or rear transition portions.

9. The trailer apparatus of claim 8, wherein each main frame member carries an apertured flange having the apertures thereof in general alignment with respective ones of said lugs on each said main frame member, said apertured flange of each of said movable rack members having at least one aperture which overlies one of said apertures in the flange carried by said main frame and a lock pin for maintaining said at least one aperture and said one of said apertures in registry.

10. A trailer apparatus for transporting metal coils comprising a pair of laterally spaced apart longitudinally extending main frame members having a front portion connected to means for removably attaching said apparatus to a motorized vehicle and a rear portion associated with axle means carrying wheels thereon, said main frame members having a central portion between said front and rear portions positioned lower than said front and rear portion, said main frame members having an angularly disposed front transition portion connecting said front and central portions and an angularly disposed rear transition portion connecting said central and rear portions, said front and rear transition portions being angularly disposed to said central portion in the range of from about 22° to about 35°, front and rear support surfaces extending transversely across said laterally spaced apart longitudinally extending main frame members respectively at said front and rear transition sections to provide front and rear rack members, support means for mounting on said frame members to form a loading rack with one or both of said front and rear rack members, a plurality of longitudinally spaced apart lugs extending from said main frame members and positioned with respect to said front and rear support surfaces such that when a support means is mounted on said lugs a coil rack is formed with one or both of said front and rear support surfaces to accommodate coils having diameters from about 36" to about 88", whereby metal coils can be supported by said front or rear rack members in combination with said support means such that the longitudinal axis of the metal coils is perpendicular to the main frame members.

11. The trailer apparatus of claim 10, wherein said front and rear support surfaces are resilient.

12. The trailer apparatus of claim 10, wherein said support means have a resilient surface to support metal coils thereon.

13. The trailer apparatus of claim 12, wherein said front and rear support surfaces and resilient support surface of said support means are angularly disposed to said main frame members about 35°.

14. A trailer apparatus for transporting metal coils comprising a pair of laterally spaced apart longitudinally extending main frame members having a front portion connected to means for removably attaching said apparatus to a motorized vehicle and a rear portion associated with axle means carrying wheels thereon, said main frame members having a central I-beam portion between said front and rear portions positioned lower than said front and rear portion, a reinforcing member fixedly connected to the bottom of said central I-beam portion, said reinforcing member being an I-beam having one flange removed, said main frame members having an angularly disposed front transition portion connecting said front and central portions and an angularly disposed rear transition portion connecting said central and rear portions, said front and rear transition portions being angularly disposed to said central portion in the range of from about 22° to about 35°, front and rear support surfaces extending transversely across said laterally spaced apart longitudinally extending main frame members respectively at said front and rear transition sections to provide front and rear rack members, support means for mounting on said frame members to form a loading rack with one or both of said front and rear rack members, a plurality of longitudinally spaced apart lugs extending from said main frame members and positioned with respect to said front and rear support surfaces such that when said support means is mounted on said lugs a coil rack is formed with one or both of said front and rear support surfaces to accommodate coils having diameters from about 36" to about 88", whereby metal coils can be supported by said front or rear rack members in combination with said support means such that the longitudinal axis of the metal coils is perpendicular to the main frame members.

15. The trailer apparatus of claim 14, wherein each main frame member is an I-beam with said lugs extending upwardly from a top flange thereof, at least one plate fixedly mounted on said I-beam and having a plurality of apertures therein, said support means having at least one aperture therein for fitting over one of said lugs on said I-beam and another aperture therein for overlying one of said apertures in said at least one plate on said I-beam, a locking pin extending through said one of said apertures in said plate and said another aperture of said support means for maintaining said at least one plate and said support means in position.

* * * * *